Patented July 4, 1950

2,514,193

UNITED STATES PATENT OFFICE 2,514,193

STABILIZATION OF SYNTHETIC AND NATURAL RUBBER WITH ANTIMONY SALTS OF PHENOL SULFIDES

Harry E. Albert, Akron, Ohio, assignor to The Firestone Tire & Rubber Company, Akron, Ohio, a corporation of Ohio No Drawing. Application January 6, 1947, Serial No. 720,486

27 Claims. (Cl. 260—45.75)

This invention relates to the stabilization of rubbers with antimony salts of phenol sulfides. The stabilizers prevent hardening of synthetic rubbers, such as GR-S and 1,3-butadiene-acrylonitrile type rubbers by oxidation or polymerization. The stabilizers act as antiflex-cracking agents in natural rubber.

The stabilizers may be used effectively in uncured and cured copolymers of a conjugated diene and either a vinyl aromatic compound or a monomer having the formula $CH_2=C(R)-X$ when R is hydrogen, methyl, ethyl, propyl or chlorine and X is $-CN$, $-COR'$, $-COOR'$ or $-CONH_2$ and R' is an alkyl group containing about 1 to 5 carbon atoms. In the latter case—that is, when the conjugated diene is copolymerized with a monomer of the formula given—the rubbery products obtained include the butadiene-1,3-acrylonitrile copolymers. GR-S is included in the first-mentioned copolymers.

The conjugated dienes which may be used as monomers in carrying out any of the copolymerization include butadiene, isoprene, 2-cyano-butadiene, cyclopentadiene, piperylene, dimethylbutadiene, 2-methyl-1,3-pentadiene, etc. The vinyl aromatic compounds which may be used as monomers include styrene, alpha-methylstyrene, nuclear-substituted styrenes, monochlorostyrene, dichlorostyrene, vinylnaphthalene, vinylbiphenyl, vinylcarbazole, 2-vinyl-5-ethylpyridine, 2-ethyl-5-vinylpyridine, etc.

The stabilizers of this invention are trivalent antimony salts of phenol sulfides. The phenol sulfides contain two or more aromatic nuclei. These nuclei may include alkyl or halogen substituents. The stabilizers include monosulfides and polysulfides although where discoloration is to be prevented, the monosulfides will ordinarily be employed. The antimony salts of the phenol sulfides may be represented by the following formula:

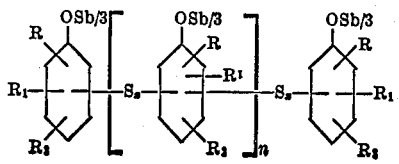

where $R$, $R_1$, and $R_2$ may be hydrogen, halogen or hydrocarbon substituents and may be different or the same in each of the aromatic nuclei; $n$ may be an integer from 0 to 3, inclusive; and $x$ may be an integer from 1 to 4, inclusive, but preferably is 1. Any number of the Sb/3 attachments may be replaced by hydrogen except that in at least one of the aromatic nuclei the hydrogen of the phenol linkage is replaced by antimony.

The stabilizers of this invention are advantageously prepared by reacting the sodium salt or other alkali or alkaline earth metal salt of the corresponding phenol sulfide with antimony trichloride under anhydrous conditions. The alkali or alkaline earth metal salt of the phenol sulfide may be prepared by reacting the corresponding metal alcoholate with the free phenol sulfide. These general reactions are, of course, limited to the treatment of phenol sulfides which are not so hindered by substituents that they will not form salts as described.

The invention is illustrated by the following examples:

EXAMPLE 1

*Antimony salt of diphenol sulfide*

To 400 cc. of anhydrous methanol, 9.2 grams of metallic sodium were added in small chunks during cooling. Forty-three and six-tenths grams of diphenol monosulfide were dissolved in the resulting solution. A solution of 32 grams of $SbCl_3$ in 50 cc. of anhydrous methanol was prepared. This solution was added to the sodium salt of diphenol sulfide slowly during stirring. After the reaction mixture had stood one hour at room temperature, it was cooled in an ice bath and the precipitate, which was shown to consist mostly of sodium chloride, filtered. Evaporation of the filtrate gave 55 grams of a grayish-white solid, the trivalent antimony salt of diphenol sulfide, which melted at 235–250° C., uncorrected, to a light yellow liquid.

EXAMPLE 2

*Antimony salt of triphenol bi(monosulfide)*

Four grams of metallic sodium were dissolved in 200 ml. of absolute alcohol during cooling. To this 20 grams of triphenol bi(monosulfide) were added to form the trisodium salt of this compound. A solution of 13.3 grams of antimony trichloride in 100 ml. of absolute alcohol was then added slowly during stirring. A copious white precipitate of the trivalent salt of triphenol bi(monosulfide) was obtained which, on filtering and drying, weighed 25 grams.

EXAMPLE 3

*Antimony salt of di(1-hydroxy-3-methyl-4-tert-butyl-phenyl) monosulfide*

Four and six-tenths grams of metallic sodium were dissolved in 200 cc. of anhydrous methanol during cooling and 35.8 grams of crude di(1-hydroxy-3-methyl-4-tert-butyl-phenyl) monosulfide added to the resulting solution. To this was added a solution of 15.2 grams of antimony trichloride in 5 cc. of methanol during stirring. A light orange precipitate was obtained which was filtered off and dried. It weighed 24.6 grams. It darkened and decomposed on heating to a high temperature. The filtrate was evaporated on a steam plate, and the residue leached with water. It was a medium brown semisolid and weighed 26.5 grams. The combined precipitate and semisolid residue, 51.1 grams, represented the crude yield of the trivalent antimony salt of di(1-hydroxy-3-methyl-4-tert-butyl-phenyl) monosulfide.

The following compounds may be similarly prepared:

Trivalent antimony salt of diphenol bisulfide
Trivalent antimony salt of diphenol polysulfide
Trivalent antimony salt of triphenol bi(disulfide)
Trivalent antimony salt of di(para-tertiary-amylphenol) monosulfide
Trivalent antimony salt of di(para-tertiary-butylphenol) disulfide
Trivalent antimony salt of di(ortho-cresol) monosulfide
Trivalent antimony salt of di(meta-cresol) monosulfide
Trivalent antimony salt of di(beta-naphthol) monosulfide
Trivalent antimony salt of di(para-phenylphenol) monosulfide
Trivalent antimony salt of di(4-benzylphenol) monosulfide
Trivalent antimony salt of di(para-chlorphenol) monosulfide The above-mentioned compounds are illustrative of the stabilizers of this invention. Other stabilizers may be used as defined in the claims. The stabilizers may be prepared by other methods than that disclosed.

STABILIZATION OF COPOLYMERS OBTAINED FROM A CONJUGATED DIENE AND A VINYL AROMATIC COMPOUND

Various stabilizers have been suggested for the rubbery copolymers of a conjugated diene and a vinyl aromatic compound. Phenyl-beta-naphthylamine is most widely used with GR-S, but it is not satisfactory for the light-colored compositions, such as the white compounds used in tire side walls. The stabilizers of this invention are superior for the stabilization of such rubbers and are to be classed as nondiscoloring.

The first of the tests recorded below shows the value of trivalent antimony salts of phenol sulfides for the stabilization of GR-S before compounding and vulcanizing. (GR-S is a copolymer of butadiene and styrene.) The tests include a plasticity determination, observance of changes in the color, and a hand test.

The plasticity determination was obtained by means of the Mooney plastometer, a standard means of measuring the plasticity of GR-S. The test designated ML-4-212 is obtained using this plastometer, with a large rotor, for 4 minutes at 212° F. The hand test was carried out by pulling and feeling the copolymer after each aging period to determine the extent of any deterioration which had set in. In the various tests 2 per cent of the stabilizer was used, and it was compounded with the copolymer by addition to the latex resulting from emulsion copolymerization of the butadiene and styrene. The drying was effected by heating 20 hours at 75° C. The dried material was then heated 4 days at 90° C. Thereafter there was a further heating at 110° C. for 2 days and for 4 days. The results of all of these tests are recorded in the table below.

TABLE I

*Copolymer aging test*

| | Antimony salt of diphenol sulfide | Phenyl-beta-naphthylamine | Stabilizer No. 1 |
|---|---|---|---|
| After drying 20 hrs. at 75° C.: | | | |
| ML-4-212 | 44 | 47 | 44. |
| Color | very light gray | brown | medium dark gray. |
| Hand Test | no deterioration | no deterioration | no deterioration. |
| Heat-aging: | | | |
| After 4 days at 90° C.— | | | |
| ML-4-212 | 36 | 38 | 36. |
| Color | light gray | brown | medium dark gray-brown. |
| Hand test | no change | no change | no change. |
| After 2 more days at 110° C.— | | | |
| Color | medium gray-brown | dark brown | brown. |
| Hand test | very slightly set up | slightly set up | slightly set up. |
| After an additional 2 days at 110° C.— | | | |
| ML-4-212 | 63 | 76 | 84. |
| Color | medium brown | dark brown | brown. |
| Hand test | somewhat set up | somewhat set up | set up. |

In the above table the stabilizer of the invention was tested against the two stabilizers most widely used with GR-S rubber, the material identified as Stabilizer No. 1 being one of these. The above data show a distinct superiority for the trivalent antimony salt of diphenol sulfide over either of the other stabilizers, both in color and in preserving the original plasticity of the polymer during the oven-aging test.

The following table shows further aging tests comparing the effect of the trivalent antimony salt of diphenol sulfide with the two commercial stabilizers used in the preceding test. Two per cent of each of the several stabilizers was added to the latex.

TABLE II

*Copolymer aging test*

|  | Antimony salt of diphenol sulfide | Stabilizer No. 1 | Phenyl-beta-naphthylamine |
|---|---|---|---|
| After drying 20 hours at 75° C.: |  |  |  |
| Color | light gray-brown | bluish gray | red-brown. |
| Hand test | no deterioration | no deterioration | no deterioration. |
| Heat-aging at 110° C.: |  |  |  |
| One day— |  |  |  |
| Color | light brown | brown | brown. |
| Hand test | no change | very slightly set up. | no change. |
| Two Days— |  |  |  |
| Color | light brown | dark brown | dark brown. |
| Hand test | no change | somewhat set up | very slightly set up. |
| Four Days— |  |  |  |
| Color | light brown | dark brown | dark brown. |
| Hand test | slightly set up | set up | somewhat set up. |

The data in the above table show that the trivalent antimony salt of diphenol sulfide gives satisfactory results, which are better than the results obtained with the commercial stabilizers from the standpoint of both unaged and aged copolymer color and from the standpoint of preservation of the rubbery properties of the copolymer.

The next table records results similar to those in the preceding two tables, comparing the trivalent antimony salt of di(4-tertiary-butyl-meta-cresol) sulfide with Stabilizer No. 1. Two per cent of each of the several stabilizers was added to the latex.

TABLE III

*Copolymer aging test*

|  | Antimony salt of di(4-tert-butyl-m-cresol) sulfide | Stabilizer No. 1 |
|---|---|---|
| After drying 20 hours at 75° C.: |  |  |
| Color | very light brownish-gray. | bluish-gray. |
| Hand test | no deterioration | no deterioration. |
| Heat-aging at 110° C.: |  |  |
| One Day— |  |  |
| Color | medium brown | brown. |
| Hand test | very slightly set up | very slightly set up. |
| Two Days— |  |  |
| Color | brown | dark brown. |
| Hand test | slightly set up | somewhat set up. |
| Four Days— |  |  |
| Color | brown | dark brown. |
| Hand test | somewhat set up | set up. |

The data in the above table show the superiority of the antimony salt of the alkylated phenol sulfide over Stabilizer No. 1 which is a widely accepted antioxidant for GR-S at the present time for nondiscoloring use.

Tables IV and V compare the properties of GR-S vulcanizates containing different stabilizers of this invention with vulcanizate similarly prepared containing Stabilizer No. 1. In each case the stabilizer was added to the latex of the copolymer before coagulation. Each of the stocks was prepared according to the following formula:

*White vulcanizate*

| Polymer containing 2% antioxidant | 100 |
|---|---|
| Coumarone resin | 10 |
| Triethyl trimethylene triamine | 1.1 |
| Wax | 2 |
| Magnesium oxide | 8 |
| Zinc oxide | 100 |
| Ultramarine blue | 0.1 |
| Titanium oxide pigment | 30 |
| Insoluble sulfur | 4 |

Two comparative runs were made on cures made for 30, 50, and 70 minutes at 300° F., and the following tables record averages of the values obtained with these stocks. The aged values represent those obtained after 4 days in a forced circulation oven at 212° F.

TABLE IV

|  | Antimony Salt of Diphenol Sulfide | Stabilizer No. 1 |
|---|---|---|
| 200% Modulus: |  |  |
| Unaged | 340 | 370 |
| Aged | 725 | 860 |
| Per Cent Increase | 214 | 233 |
| Tensile: |  |  |
| Unaged | 1,490 | 1,300 |
| Aged | 1,440 | 1,400 |
| Per Cent of Unaged | 96.5 | 107.5 |
| Elongation: |  |  |
| Unaged | 580 | 490 |
| Aged | 420 | 370 |
| Per Cent of Unaged | 72.5 | 75.5 |

The above data show the two antioxidants to be approximately equivalent in normal and aged properties.

TABLE V

|  | Antimony Salt of 4-tert-butyl-m-cresol Sulfide | Stabilizer No. 1 |
|---|---|---|
| 200% Modulus: |  |  |
| Unaged | 160 | 150 |
| Aged | 270 | 330 |
| Per Cent of Unaged | 170 | 220 |
| Tensile: |  |  |
| Unaged | 1,125 | 1,000 |
| Aged | 1,225 | 1,125 |
| Per Cent of Unaged | 109 | 112.5 |
| Elongation: |  |  |
| Unaged | 505 | 470 |
| Aged | 405 | 330 |
| Per Cent of Unaged | 80.0 | 80.5 |

The above data show the antimony salt of 4-tert-butyl-m-cresol sulfide to be equivalent to Stabilizer No. 1.

The unaged white vulcanizates, prepared as described, were subjected to discoloration tests with the results recorded in Tables VI and VII.

TABLE VI

*Artificial exposure tests*

| Antitoxidant | Fadeometer at 125° F. | | G. E. Sunlamp at 7" | |
|---|---|---|---|---|
| | 5 Hours | 10 Hours | 8 Hours | 16 Hours |
| Antimony salt of diphenol sulfide | white | white | white | tan. |
| Stabilizer No. 1 | tan | light brown | tan | light brown. |

*Natural exposure*

| Antitoxidant | 2 Months in Florida (February-April) | 2 Months in Florida + 2 Months in Akron (May-July) |
|---|---|---|
| Antimony salt of diphenol sulfide | white | very slightly discolored. |

TABLE VII

*Artificial exposure tests*

| Antioxidant | Fadeometer at 125° F. | | G. E. Sunlamp at 7" | |
|---|---|---|---|---|
| | 5 Hours | 10 Hours | 8 Hours | 16 Hours |
| Antimony salt of 4-tert-butyl-m-cresol sulfide. | white | white | white | light cream. |
| Stabilizer No. 1 | cream | light brown | tan | light brown. |

*Natural exposure*

| Antioxidant | 2 Months in Akron (May-July) |
|---|---|
| Antimony salt of 4-tert-butyl-m-cresol sulfide | white. |
| Stabilizer No. 1 | dark tan. |

STABILIZATION OF COPOLYMERS OBTAINED FROM COPOLYMERIZATION OF A CONJUGATER DIENE AND A MONOMER HAVING THE FORMULA $CH_2=C(R)-X$

The stabilization of this type of copolymer is illustrated by stabilization of the copolymer obtained from butadiene and acrylonitrile. The first table below compares the stabilizing effect of a stabilizer on a copolymer formed from 68 per cent butadiene and 32 per cent acrylonitrile prior to vulcanization; i. e., during the drying of the coagulum and thereafter as indicated. Two per cent of the stabilizer was added to the copolymer latex resulting from emulsion copolymerization. The first table records changes in the color and changes in the physical properties as indicated by the hand test used in recording results in the preceding tables.

TABLE VIII

| | Antimony salt of triphenol bi (monosulfide) | Blank |
|---|---|---|
| After Drying: | | |
| Color | tan with yellow tinge | tan. |
| Hand test | no deterioration | somewhat hardened. |
| Heat-aged at 90° C.: | | |
| One Day— | | |
| Color | tan | resinous brown. |
| Hand test | moderately set up | |
| Two Days— | | |
| Color | tan | |
| Hand test | moderately set up | |
| Three Days— | | |
| Color | tan | |
| Hand test | set up | |
| Four Days— | | |
| Color | tan | |
| Hand test | set up | |

The above data show the stabilizing effect of triphenol bi(monosulfide) compared to a blank containing no stabilizer which not only turned dark rapidly but became hard and resinous as indicated.

The next table records tests conducted with the copolymer to which 2 per cent of different stabilizers was added, including a phenol sulfide from which the antimony salt was prepared, and a blank containing no stabilizer. The stabilizers were added to the latex, as before.

TABLE IX

| Antioxidant | After Drying | | Heat-aged 4 Days at 90° C. | |
|---|---|---|---|---|
| | Color | Hand Test | Color | Hand Test |
| Antimony salt of diphenol sulfide | chalky-white | no deterioration | opalescent cream. | good. |
| Antimony salt of triphenol bi(monosulfide) | yellow-tan | do | brown | Do. |
| Diphenol sulfide | cream-white | do | tan | fair. |
| Blank | tan | somewhat hardened | brown | resinous (very poor). |

The above table shows that both antimony salts are greatly superior to the blank so far as preventing stiffening is concerned and are an aid in preventing discoloration. They further show the antimony salts to be superior to diphenol sulfide as a stabilizer.

The next table refers to tests conducted on a copolymer produced from 55 per cent butadiene and 45 per cent acrylonitrile, to the latex of which 2 per cent of different stabilizers was added.

TABLE X

| Antioxidant | After Drying | | Heat-aged 4 Days at 100° C. | |
|---|---|---|---|---|
| | Color | Hand Test | Color | Hand Test |
| Antimony salt of diphenol sulfide | chalky-cream | no deterioration | milky gray-tan | good. |
| Stabilizer No. 1 | gray | do | brown-black | Do. |
| Blank | light tan | stiff | dirty brown | very poor. |

The above data show an advantage for the antimony salt over the blank in both color and preservation of plasticity and show the antimony salt to be superior to Stabilizer No. 1 with respect to color preservation.

Tests were conducted on a vulcanizate produced from the first-mentioned copolymer (68 per cent butadiene and 32 per cent acrylonitrile) containing 2 per cent of stabilizers added to the latex. The stock was compounded according to the following formula:

| | |
|---|---|
| Copolymer containing 2% stabilizer | 100 |
| Stearic acid | 3.5 |
| Zinc oxide | 5 |
| Channel black | 40 |
| Sulfur | 2 |
| Accelerator | 1.3 |
| | 151.8 |

Samples of the stock were cured for 60 and 80 minutes at 274° F., and the average of test results for samples subjected to these different cures are recorded in the table below. The tests of aged stock refer to stock aged 4 days in an oven at 212° F.

TABLE XI

| | Antimony Salt of Triphenol Bi(monosulfide) | Phenyl-beta-naphthylamine |
|---|---|---|
| 300% Modulus: | | |
| Normal | 1,100 | 1,075 |
| Aged | 2,350 | 2,125 |
| Tensile: | | |
| Normal | 3,375 | 3,800 |
| Aged | 3,600 | 3,225 |
| Per Cent of Normal | 107 | 85 |
| Elongation: | | |
| Normal | 575 | 610 |
| Aged | 390 | 395 |
| Per Cent of Normal | 67.8 | 64.8 |

The above data show an advantage for the antimony salt of triphenol di(monosulfide) over phenyl-beta-naphthylamine in aged tensile and elongation properties.

The following table compares the properties of stock similarly compounded containing antimony diphenol sulfide and phenyl-beta-naphthylamine and shows the former to be at least equivalent to the phenyl-beta-naphthylamine as a stabilizer when tested 10 hours at 260° F. in an air bomb under 60 pounds of air:

TABLE XII

| | Antimony Diphenol Sulfide | Phenyl-beta-naphthylamine |
|---|---|---|
| 300% Modulus: | | |
| Normal | 900 | 975 |
| Aged | 2,375 | 2,325 |
| Tensile: | | |
| Normal | 3,100 | 3,175 |
| Aged | 2,475 | 2,475 |
| Per Cent of Normal | 79.8 | 78.0 |
| Elongation: | | |
| Normal | 560 | 575 |
| Aged | 310 | 320 |
| Per Cent of Normal | 55.3 | 55.6 |

A further test was made to compare the discoloring effect of the stabilizers of this invention with the commonly used stabilizers in white stocks. The stabilizers were added to the latex. The stocks were compounded according to the following formula:

| | |
|---|---|
| Copolymer containing 2% stabilizer | 100 |
| Sulfur | 3 |
| Cumar resin (softener) | 7.5 |
| Magnesium oxide | 5 |
| Zinc oxide | 85 |
| Clay | 20 |
| Titanium oxide | 20 |
| Dibenzothiazyl disulfide | 0.9 |
| Zinc diethyl dithiocarbamate | 0.4 |
| | 241.8 |

Stocks thus compounded were cured 40 minutes and 60 minutes at 280° F., and the following table records the average value for tests conducted on such stocks:

TABLE XIII

| | Antimony Salt of Diphenol Sulfide | Phenyl-beta-naphthylamine |
|---|---|---|
| Modulus: | | |
| 300% Normal | 1,000 | 925 |
| 200% Aged | 900 | 900 |
| Tensile: | | |
| Normal | 1,350 | 1,525 |
| Aged | 1,025 | 1,100 |
| Percent of Normal | 76 | 72 |
| Elongation: | | |
| Normal | 340 | 350 |
| Aged | 215 | 220 |
| Percent of Normal | 63 | 63 |

These test results show the antimony salt to be at least equivalent to phenyl-beta-naphthylamine as a stabilizer.

To compare the stabilizing effect of the compounds of this invention in such white vulcanizate when exposed to light, samples of the stock were subjected to 10 hours' treatment in a fadeometer at 125° F. and 16 hours' under a sunlamp at a distance of 7 inches. The following table compares the effect of such lights on stock treated with a stabilizer of this invention, stock containing no stabilizer, and stocks containing the common commercial stabilizers, and shows that these commercial stabilizers produce discoloration, whereas in the stock containing the stabilizer of this invention no more discoloration occurred than in the blank in which no antioxidant was used. The stabilizer of this invention is shown to be very much better than the phenyl-beta-naphthylamine from the standpoint of discoloration and definitely superior to stalite.

TABLE XIV

| Antitoxidant | Fadeometer | Sunlamp |
|---|---|---|
| Stabilizer No. 1 | light tan | light tan. |
| Antimony salt of diphenol sulfide. | light cream | very light cream. |
| Phenyl-beta-naphthylamine | brown | gray-brown. |
| Blank (no antioxidant) | light cream | very light cream. |

STABILIZATION OF NATURAL RUBBER

The trivalent antimony salt of diphenol sulfide was added to a compound of natural rubber prepared for use in the white side walls of tires. One per cent of the stabilizer was used to determine its antiflex-cracking effect. The stabilizer was added on the mill and to the latex as indicated in the table below. The compounding formulae are contained in the following table:

TABLE XV

| Formulation | Antioxidant Added on Mill A | Antioxidant Added to Latex B | Blank C |
|---|---|---|---|
| Crepe rubber | 100 | 100 | 100 |
| Wax | 2 | 2 | 2 |
| Ultramarine | 0.1 | 0.1 | 0.1 |
| Zinc oxide | 72 | 72 | 72 |
| Titanium dioxide | 20 | 20 | 20 |
| Sulfur | 3 | 3 | 3 |
| Stearic acid | 1 | 1 | 1 |
| Accelerator | 0.4 | 0.4 | 0.4 |
| Activator | 0.5 | 0.5 | 0.5 |
| Antimony diphenol sulfide | 1 | 1 | |
| | 200.0 | 200.0 | 199.0 |

The different stocks were cured in 0.100 inch gauge slabs at 280° F. for 20, 40, and 60 minutes, respectively. Two ½-inch dumbbell strips were died from each slab. These were flexed from 0 to 75 per cent on a side-wall flexing machine, such as that described in U. S. 2,048,314, issued to R. W. Allen. The flexing was continued until the representative slabs had been broken. The results of the tests are recorded in the following table:

TABLE XVI

| | | Total Flex-Life, Hours | Per Cent Improvement |
|---|---|---|---|
| A | Antimony diphenol sulfide (milled in) | 30.32 | 40 |
| B | Antimony diphenol sulfide (added to latex) | 28.88 | 33 |
| C | Blank | 21.72 | |

From these data it is apparent that the addition of a small amount of an antimony salt of a phenol sulfide to a natural rubber compound increases its flex life appreciably.

Tapered dumbbell strips as above described under 12.5 per cent elongation were exposed for 8 weeks each to sunny weather in Florida and to cloudy weather in Northern Ohio. The results are recorded in Table XVII.

TABLE XVII

| | | Color after 8 Weeks Exposure in— | |
|---|---|---|---|
| | | Florida | N. Ohio |
| A | Antimony diphenol sulfide (milled in) | white | white. |
| B | Antimony diphenol sulfide (added to latex). | do | Do. |
| C | Blank | do | Do. |

The appearance of the strips after exposure to weather demonstrates that the stabilizer does not affect the color of the stock.

The above tests and results are representative. The amount of stabilizer used may vary from about 0.1 to 10 per cent. The invention is defined in the appended claims.

This application is a continuation-in-part of my copending applications Serial Nos. 623,851 and 623,852, filed October 22, 1945, now abandoned.

What I claim is:

1. A stabilized rubber composition composed essentially of rubber of the class consisting of natural rubber, rubbery copolymers of a butadiene-1,3 and a styrene, and rubbery copolymers of a butadiene-1,3 and an acrylonitrile and a relatively small quantity of a trivalent antimony salt of a phenol sulfide.

2. The composition of claim 1 characterized by the fact that the rubber is in latex form and is uncured.

3. The product of claim 1 characterized by the fact that the rubber is cured and the composition is a solid.

4. The product of claim 1 characterized by the fact that the stabilizer is a trivalent antimony salt of an alkylphenol sulfide.

5. Cured natural rubber stabilized with a relatively small quantity of the trivalent antimony salt of a diphenol sulfide.

6. Cured rubbery copolymer of butadiene-1,3 and styrene stabilized with a relatively small quantity of a trivalent antimony salt of a phenol sulfide.

7. The process of treating a rubber of the class consisting of natural rubber, rubbery copolymers of a butadiene-1,3 and a styrene, and rubbery copolymers of a butadiene-1,3 and an acrylonitrile, comprising heating the rubber in the presence of a relatively small quantity of a trivalent antimony salt of a phenol sulfide.

8. The process of claim 7 characterized by the fact that the stabilizer is a trivalent antimony salt of an alkylphenol sulfide.

9. The method of drying coagulum of a rubbery copolymer of butadiene-1,3 and styrene, comprising heating the coagulum in the presence of a relatively small quantity of the trivalent antimony salt of a diphenol sulfide.

10. The method of drying coagulum of a rubbery copolymer of butadiene-1,3 and styrene, comprising heating the coagulum in the presence of a relatively small quantity of the trivalent antimony salt of an alkylphenol sulfide.

11. The method of drying coagulum of a rubbery copolymer of butadiene-1,3 and acrylonitrile, comprising heating the coagulum while admixed with a relatively small quantity of the trivalent antimony salt of a diphenol sulfide.

12. The method of drying coagulum of a rubbery copolymer of butadiene-1,3 and acrylonitrile, comprising heating the coagulum while admixed with a relatively small quantity of the trivalent antimony salt of an alkylphenol sulfide.

13. The method of curing natural rubber, comprising heating the rubber compounded with sulfur and, as a stabilizer, a relatively small quantity of a trivalent antimony salt of a phenol sulfide.

14. The method of claim 13 characterized by the fact that the stabilizer is the trivalent antimony salt of an alkylphenol sulfide.

15. The method of curing rubbery copolymer of butadiene-1,3 and styrene, comprising heating the copolymer with sulfur and, as a stabilizer, a relatively small quantity of a trivalent antimony salt of a phenol sulfide.

16. The method of claim 15 characterized by the fact that the stabilizer is the trivalent antimony salt of an alkylphenol sulfide.

17. The method of curing rubbery copolymer of butadiene-1,3 and acrylonitrile, comprising heating the copolymer in the presence of sulfur and, as a stabilizer, a relatively small quantity of a trivalent antimony salt of a phenol sulfide.

18. The method of claim 17 characterized by the fact that the stabilizer is the trivalent antimony salt of an alkylphenol sulfide.

19. The method of stabilizing a rubbery copolymer of butadiene-1,3 and styrene with a relatively small quantity of a nondiscolorizing stabilizer, comprising mixing the copolymer with a trivalent antimony salt of a phenol sulfide.

20. A rubbery copolymer of butadiene-1,3 and styrene stabilized with a trivalent antimony salt of a phenol sulfide.

21. A light-colored, stabilized composition containing a rubbery copolymer of the class consisting of the cured and uncured rubbery copolymers of butadiene-1,3 and acrylonitrile, and comprising as a stabilizer a relatively small quantity of a trivalent antimony salt of a phenol sulfide.

22. Cured rubbery copolymer of butadiene-1,3 and acrylonitrile stabilized with a relatively small quantity of a trivalent antimony salt of a phenol sulfide.

23. Rubbery copolymer of butadiene-1,3 and acrylonitrile stabilized with a relatively small quantity of the trivalent antimony salt of diphenol sulfide.

24. Uncured rubbery copolymer of butadiene-1,3 and acrylonitrile stabilized with a relatively small quantity of a trivalent antimony salt of a phenol sulfide.

25. Rubbery copolymer of butadiene-1,3 and acrylonitrile stabilized with a relatively small quantity of the trivalent antimony salt of triphenol bi(monosulfide).

26. The method of drying coagulum of a rubbery copolymer of butadiene-1,3 and acrylonitrile, comprising heating the copolymer in the presence of a relatively small quantity of the trivalent antimony salt of triphenol bi(monosulfide).

27. Method of curing a rubber of the class consisting of natural rubber, rubbery copolymers of a butadiene-1,3 and a styrene, and rubbery copolymers of a butadiene-1,3 and an acrylonitrile, comprising heating the rubber in the presence of sulfur and, as a stabilizer, a relatively small quantity of a trivalent antimony salt of a phenol sulfide.

HARRY E. ALBERT.

REFERENCES CITED

The following references are of record in the file of this patent:

UNITED STATES PATENTS

| Number | Name | Date |
|---|---|---|
| 2,310,449 | Lightbown et al. | Feb. 9, 1943 |
| 2,340,938 | Daly | Feb. 8, 1944 |
| 2,366,874 | Reeff | Jan. 9, 1945 |
| 2,380,299 | Evans et al. | July 10, 1945 |